(12) United States Patent
Anezaki et al.

(10) Patent No.: US 10,122,879 B2
(45) Date of Patent: Nov. 6, 2018

(54) IMAGE PROCESSING DEVICE, IMAGE PROCESSING SYSTEM AND NON-TRANSITORY READABLE RECORDING MEDIUM

(71) Applicant: Konica Minolta, Inc., Tokyo (JP)

(72) Inventors: Kazuya Anezaki, Hyogo (JP); Atsushi Ohshima, Hyogo (JP); Kenji Matsuhara, Hyogo (JP); Satoshi Masuda, Osaka (JP); Daisuke Sakiyama, Hyogo (JP); Takeshi Maekawa, Osaka (JP); Hironori Harada, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 5 days.

(21) Appl. No.: 15/375,122

(22) Filed: Dec. 11, 2016

(65) Prior Publication Data

US 2017/0171411 A1 Jun. 15, 2017

(30) Foreign Application Priority Data

Dec. 10, 2015 (JP) ................................. 2015-240783

(51) Int. Cl.
*H04N 1/00* (2006.01)
*H04N 1/32* (2006.01)
*H04N 1/327* (2006.01)
*H04N 1/333* (2006.01)

(52) U.S. Cl.
CPC ..... *H04N 1/00891* (2013.01); *H04N 1/00244* (2013.01); *H04N 1/00933* (2013.01); *H04N 1/32625* (2013.01); *H04N 1/32765* (2013.01); *H04N 1/32795* (2013.01); *H04N 1/33384* (2013.01); *H04N 2201/0094* (2013.01)

(58) Field of Classification Search
USPC ........................................................ 358/1.15
See application file for complete search history.

(56) References Cited

U.S. PATENT DOCUMENTS

| 2014/0092418 A1* | 4/2014 | Kishimoto | ......... H04N 1/00896 358/1.14 |
| 2014/0355052 A1* | 12/2014 | Mikashima | ........ H04N 1/00896 358/1.15 |

FOREIGN PATENT DOCUMENTS

| JP | 2015115831 A | 6/2005 |
| JP | 2014075655 A | 4/2014 |
| JP | 2014231175 A | 12/2014 |

* cited by examiner

*Primary Examiner* — Neil R McLean
*Assistant Examiner* — Darryl V Dottin
(74) *Attorney, Agent, or Firm* — Osha Liang LLP

(57) ABSTRACT

An image processing device that communicates with a first server and a second server includes a main controller and a power controller. The main controller establishes a connection that enables communication with the first and second servers, establishes a periodic communication with the first and second servers to maintain the connection, manages a first time interval between the periodic communication with the first server, manages a second time interval between the periodic communication with the second server, and changes one or both of the first time interval and the second time interval. The power controller stops and starts power supply to the main controller.

21 Claims, 13 Drawing Sheets

IMAGE PROCESSING SYSTEM 1

FIG. 3

PERIODIC COMMUNICATION INFORMATION 22

| PERIODIC COMMUNICATION INTERVAL (MINS) 22a | TIMEOUT PERIOD (MINS) 22b | CHANGEABLE RANGE (MINS) 22c |
|---|---|---|
| 5 | 10 | 3~10 |

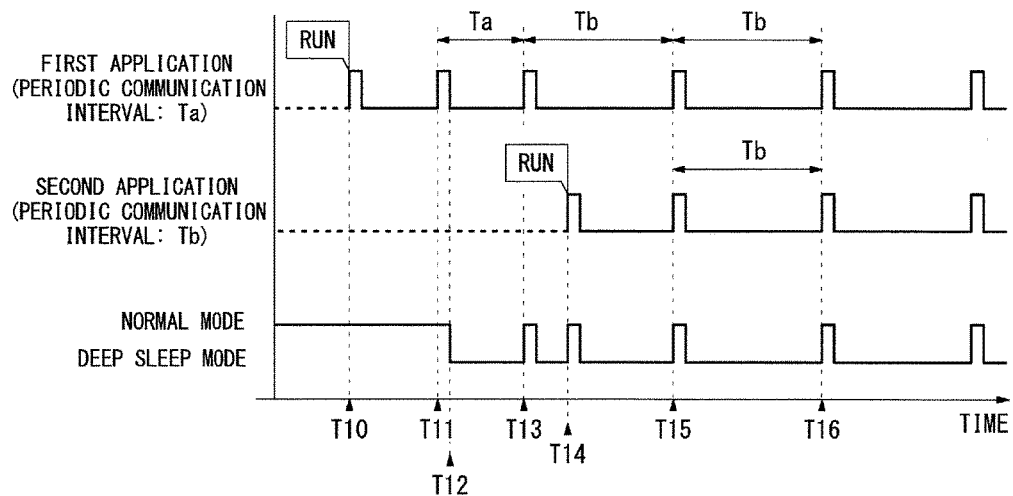
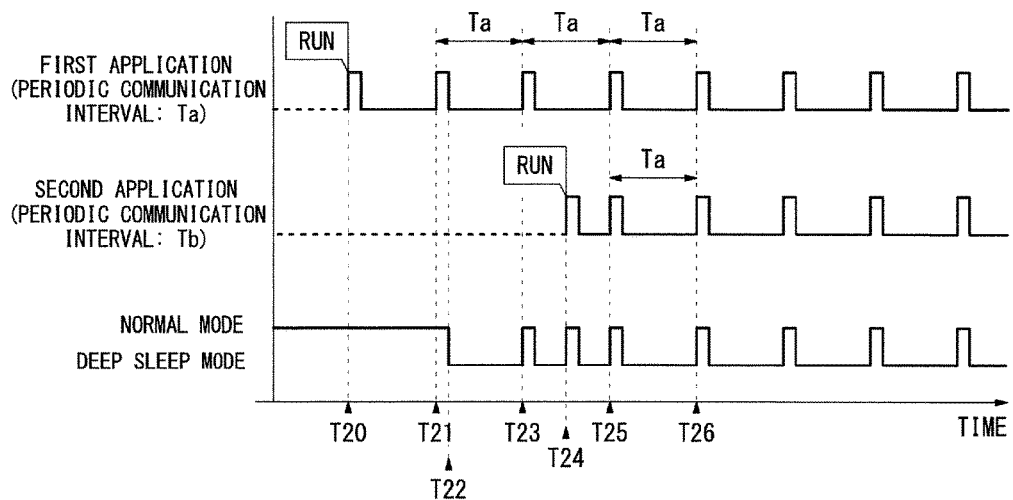

IMAGE PROCESSING DEVICE, IMAGE PROCESSING SYSTEM AND NON-TRANSITORY READABLE RECORDING MEDIUM

This application is based on the application No. 2015-240783 filed in Japan, the contents of which are hereby incorporated by reference.

BACKGROUND OF THE INVENTION

Field of the Invention

The present invention relates to an image processing device, an image processing system and a non-transitory readable recording medium. One or more embodiments of the present invention more specifically relate to a technique to enhance power-saving effect at the image processing device that maintains a connection with a server.

Description of the Background Art

Image processing devices such as MFPs (Multi-Function Peripherals) are capable of executing jobs by working together with a server installed on a cloud on Internet. The image processing device accesses the server on Internet from a local environment, for example, thereby storing image data generated by a scan job or executing a job such as a print job by obtaining the image data stored in the server.

In the local environment where the image processing device is installed, it is general to build a firewall in a view of security. In order to send the print job from the server to the image processing device as the image processing device is not accessing the server, it is required to develop an environment that enables the server on Internet to communicate with the image processing device over the firewall.

It is conventionally introduced to install a dedicated gateway for communication with the server on Internet in the local environment to develop the above-described environment. This known technique is introduced for example in Japanese Patent Application Laid-Open No. JP 2015-115831 A. According to the known gateway, it establishes a constant connection using XMPP (eXtensible Messaging and Presence Protocol) with the server on Internet when it is powered on, for example, thereby establishing a path that allows the server to communicate with the image processing device in the local environment over the firewall. Hence, even when the image processing device is not accessing the server, the server on Internet communicates by a tunnel by using the path established between the gateway and the server, thereby sending information such as the print job to the image processing device in the local environment.

The image processing device having a function of the above-described gateway function has been provided recently. The image processing device is configured to establish the connection with the server on Internet and communicate with the server on a periodical basis.

On the other hand, the image processing device has a sleep function aimed at electric power-saving. Even when the connection with the server is established, the image processing device enters a deep sleep mode if a predetermined condition is met. Once entering the deep sleep mode, the image processing device stops a function to communicate with the server on the periodical basis. The periodic communication with the server is not established, and the connection between the image processing device and the server may be terminated. In order to avoid this, even when the image processing device enters the deep sleep mode, it is required to put the power state of the image processing device back to an original normal mode at the predetermined time intervals to establish the periodic communication with the server.

The number of servers with which the image processing device establishes the constant connection is not always one. It is general to have the image processing device establishing the constant connections with the multiple servers on Internet to use a variety of cloud services. It is assumed that the image processing device establishes the constant connections with the multiple servers. In this case, the image processing device is required to establish a periodic communication with each server. The time interval between the periodic communications is different for each server. The image processing device, therefore, is often back to normal mode for the periodic communication with each server even soon after entering deep sleep mode. The conventional image processing devices are not allowed to obtain a full power saving effect.

SUMMARY OF THE INVENTION

One or more embodiments of the present invention provide an image processing device, an image processing system and a non-transitory computer readable recording medium capable of obtaining an additional power saving effect compared to that in the past.

One or more embodiments of the present invention are directed to an image processing system comprising: a terminal device that is provided with a display part; and an image processing device that outputs screen data to the terminal device, thereby enabling the display part to display a screen based on the screen data.

According to one or more embodiments, the image processing device includes: a storage part in which multiple types of the screen data corresponding to respective screen sizes are stored; a screen information obtaining part that obtains information relating to the screen size of the display part; a screen data selecting part that selects the screen data corresponding to the screen size smaller than the screen size of the display part from among the multiple types of the screen data based on the information obtained by the screen information obtaining part; and an output part that outputs the screen data selected by the screen data selecting part to the terminal device.

One or more embodiments of the present invention are directed to an image processing device that outputs screen data to a display part, thereby enabling the display part to display a screen based on the screen data.

According to one or more embodiments, the image processing device comprises: a storage part in which multiple types of the screen data corresponding to respective screen sizes are stored; a screen information obtaining part that obtains information relating to the screen size of the display part; a screen data selecting part that selects the screen data corresponding to the screen size smaller than the screen size of the display part from among the multiple types of the screen data based on the information obtained by the screen information obtaining part; and an output part that outputs the screen data selected by the screen data selecting part to the display part.

One or more embodiments of the present invention are directed to a non-transitory computer readable recording medium storing a program to be executed by an image processing device capable of managing multiple types of screen data corresponding to respective screen sizes.

According to one or more embodiments, the program executed on the image processing device to function as a system comprising: a screen information obtaining part that obtains information relating to the screen size of a display part which is a target of an output of the screen data; a screen data selecting part that selects the screen data corresponding to the screen size smaller than the screen size of the display part from among the multiple types of the screen data based on the information obtained by the screen information obtaining part; and an output part that outputs the screen data selected by the screen data selecting part to the display part.

One or more embodiments of the present invention are directed to a terminal device capable of communicating with an image processing device that stores therein multiple types of screen data corresponding to respective screen sizes.

According to one or more embodiments, the terminal device comprises: a display part in a predetermined screen size; an information obtaining part that obtains information relating to the multiple types of the screen data from the image processing device; a screen data requesting part that selects the screen data corresponding to the screen size smaller than the screen size of the display part from among the multiple types of the screen data based on the information obtained by the information obtaining part and sends a request to the image processing device; and a display controller that obtains the screen data corresponding to the screen size requested by the screen data requesting part from the image processing device, and enables the display part to display a screen based on the screen data.

BRIEF DESCRIPTION OF THE DRAWINGS

Advantages and features of one or more embodiments of the present invention will become more fully understood from the detailed description given hereinbelow and the appended drawings which are given by way of illustration only, and thus are not intended as a definition of the limits of the present invention, and wherein:

FIG. 3 shows an example of periodic communication information;

FIGS. 8A and 8B show timings for a first application and a second application to establish periodic communications;

DESCRIPTION OF EMBODIMENTS

Figure 1:
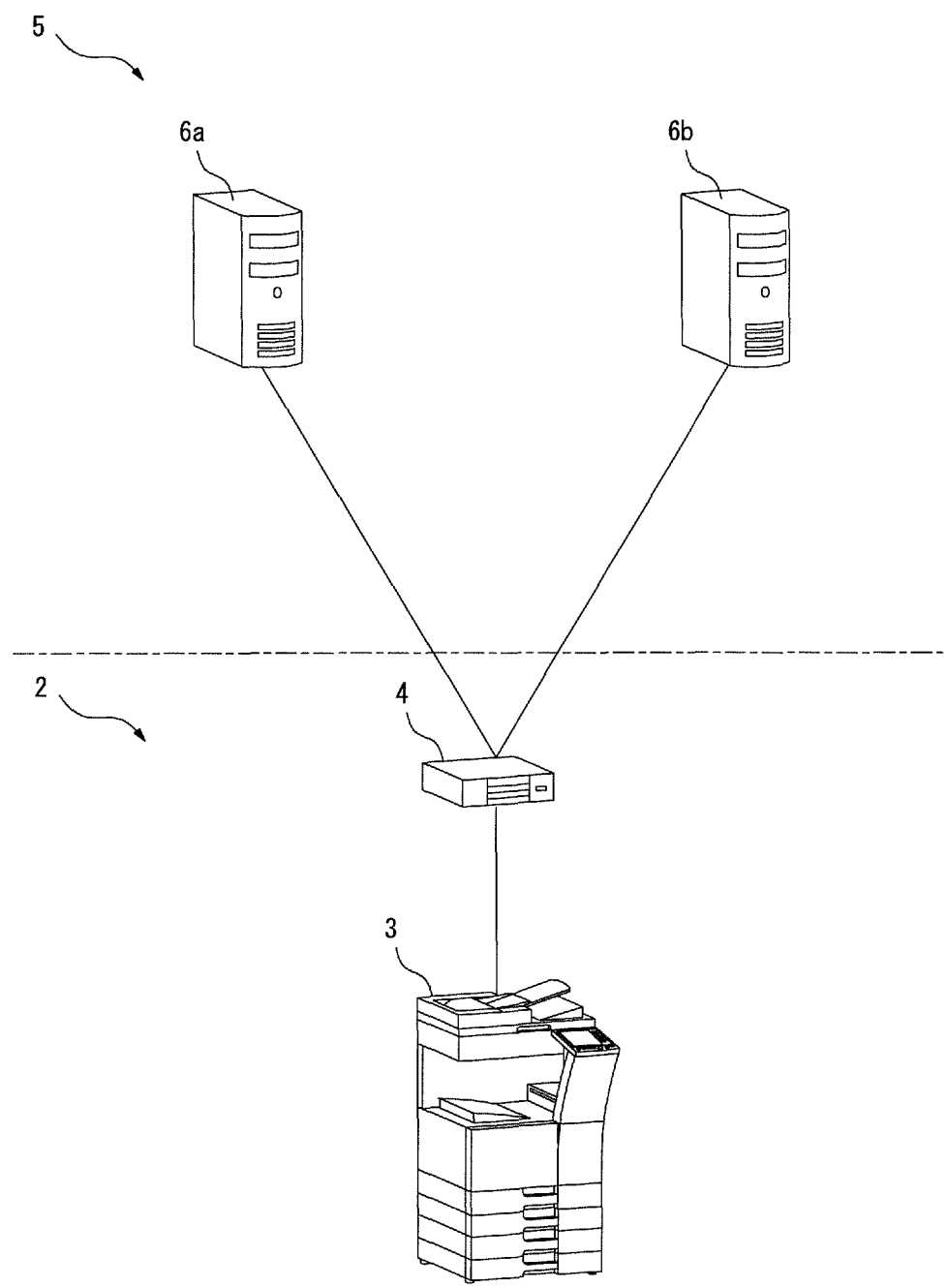
FIG. 1 shows an exemplary configuration of an image processing system.

Embodiments of the present invention are described in detail below with reference to figures. In the description given below, those elements which are shared in common among figures are represented by the same reference numerals, and these elements are not discussed repeatedly for the same description.

FIG. 1 shows an exemplary configuration of an image processing system 1 of one or more embodiments of the present invention. The image processing system 1 comprises an image processing device 3 and a communication relay device 4 on a local network 2 such as a LAN (Local Area Network). A first server 6a and a second server 6b are installed on a cloud 5 on Internet. For example, in one or more embodiments, the two servers, the first server 6a and the second server 6b, are installed on the cloud 5. However, this is given not for limitation. The number of the installed servers may be more than three.

The image processing device 3 constructed by a device such as one of MFPs, for instance, is capable of executing a variety of jobs including a scan job and a print job. The image processing device 3 is also capable of executing the job by working together with each of the first server 6a and the second server 6b on the cloud 5. The image processing device 3 has a sleep function aimed at a power-saving. When a certain state such as no user uses the image processing device 3 more than a predetermined period of time is occurred, for example, the sleep function is activated and the power supply to each processing part is stopped.

The communication relay device 4 is constructed by a device such as a network router, for instance. The communication relay device 4 connects the local network 2 to Internet. The communication relay device 4 has a firewall function. The communication relay device 4 blocks the access to the local network 2 from Internet besides the communications using constant connections established between the image processing device 3 and the respective first and second servers 6a and 6b.

Each of the first server 6a and the second server 6b provides a cloud service. The services provided by the first server 6a and the second server 6b include a variety of services such as a storage service to store a various types of data including document data and/or image data, an edit service to edit data such as a document and/or an image and an update service to update a firmware of the image processing device 3.

An application to execute the job by working together with each of the first server 6a and the second server 6b is installed in advanced on the image processing device 3 on the above-described image processing system 1. After one of the applications run on the image processing device 3, the image processing device 3 establishes a connection using a XMPP with the server 6a or 6b on the cloud 5. To be more specific, the image processing device 3 sends a connection request to an address of each server 6a and 6b on the cloud 5 via the communication relay device 4. The servers 6a and 6b establish new paths using the XMPP and establish the connections with the image processing device 3 based on the connection requests from the image processing device 3. The servers 6a and 6b communicate with the image processing device 3 on the periodical basis through the paths, thereby maintaining the connections with the image processing device 3. The connections between the image processing device 3 and the respective servers 6a and 6b are maintained so that each server 6a and 6b is capable of sending the print job to the image processing device 3 installed in the local network 2 using the connection. It is assumed that a user operates an information processing terminal such as a smartphone or a tablet terminal to access the server 6a or 6b, specifies data stored in the server 6a or 6b to print, and designates the image processing device 3 in the local network 2 as a destination of the print job. In this case, the print job is sent from the server 6a or 6b to the image processing device 3. After receiving the print job from the server 6a or 6b, the image processing device 3 executes the print job, thereby producing a printed output based on the data specified by the user. The servers 6 and 6b are capable of sending jobs other than the print job to the image processing device 3 using the connections with the image processing device 3. Also, the servers 6a and 6b send the firmware to the image processing device 3, thereby enabling an update of the firmware of the image processing device 3.

If the periodic communication with the image processing device 3 is stopped for more than a predetermined period of time, each of the server 6a and the server 6b terminates the connection with the image processing device 3. Thus, the servers 6a and 6b are not allowed to send data such as the job and/or the firmware to the image processing device 3 in the local network 2.

After the connection between the image processing device 3 and the server 6a or 6b is established, the communication relay device 4 generates connection information and manages the connection (path) between the image processing device 3 and the server 6a or 6b. A local address of the image processing device 3 in the local network 2 and an Internet address of each server 6a and 6b on the cloud 5 are associated with each other and registered as the connection information. The communication relay device 4 refers to the connection information, thereby relaying the communications between the image processing device 3 and the respective servers 6a and 6b. The communications between the image processing device 3 and the respective servers 6a and 6b are established on a periodical basis so that the communication relay device 4 keeps the connection information. If the periodic communications between the image processing device 3 and the respective servers 6a and 6b stop for more than the predetermined period of time, the communication relay device 4 discards the connection information and deletes the connections between the image processing device 3 and the respective servers 6a and 6b as targets to manage. In this case, the connections between the image processing device 3 and the respective servers 6a and 6b are terminated by the communication relay device 4, and the servers 6a and 6b are no longer capable of sending the data such as the job and/or the firmware to the image processing device 3 in the local network 2.

After establishing the connections with the respective servers 6a and 6b by running the applications, the image processing device 3 communicates with the respective servers 6a and 6b on the periodical basis to maintain the connections. It is assumed that the multiple applications run on the image processing device 3 and the connections with the multiple servers 6a and 6b are established at the same time on the cloud. Especially in such a case, each of the multiple applications establishes the communication with the respective servers 6a and 6b on the periodical basis. It is general, however, for each of the multiple applications to have the different time interval between the periodic communications with the respective servers 6a and 6b on the cloud 5. After running the multiple applications, each of the multiple applications adjusts the time interval between the periodic communications with the respective servers 6a and 6b so that the image processing device 3 controls to reduce the frequency of wake-up from sleep mode and maintain the connections with the respective servers 6a and 6b in a good condition. The detail of the above-described image processing system 1 is described next.

Figure 2:
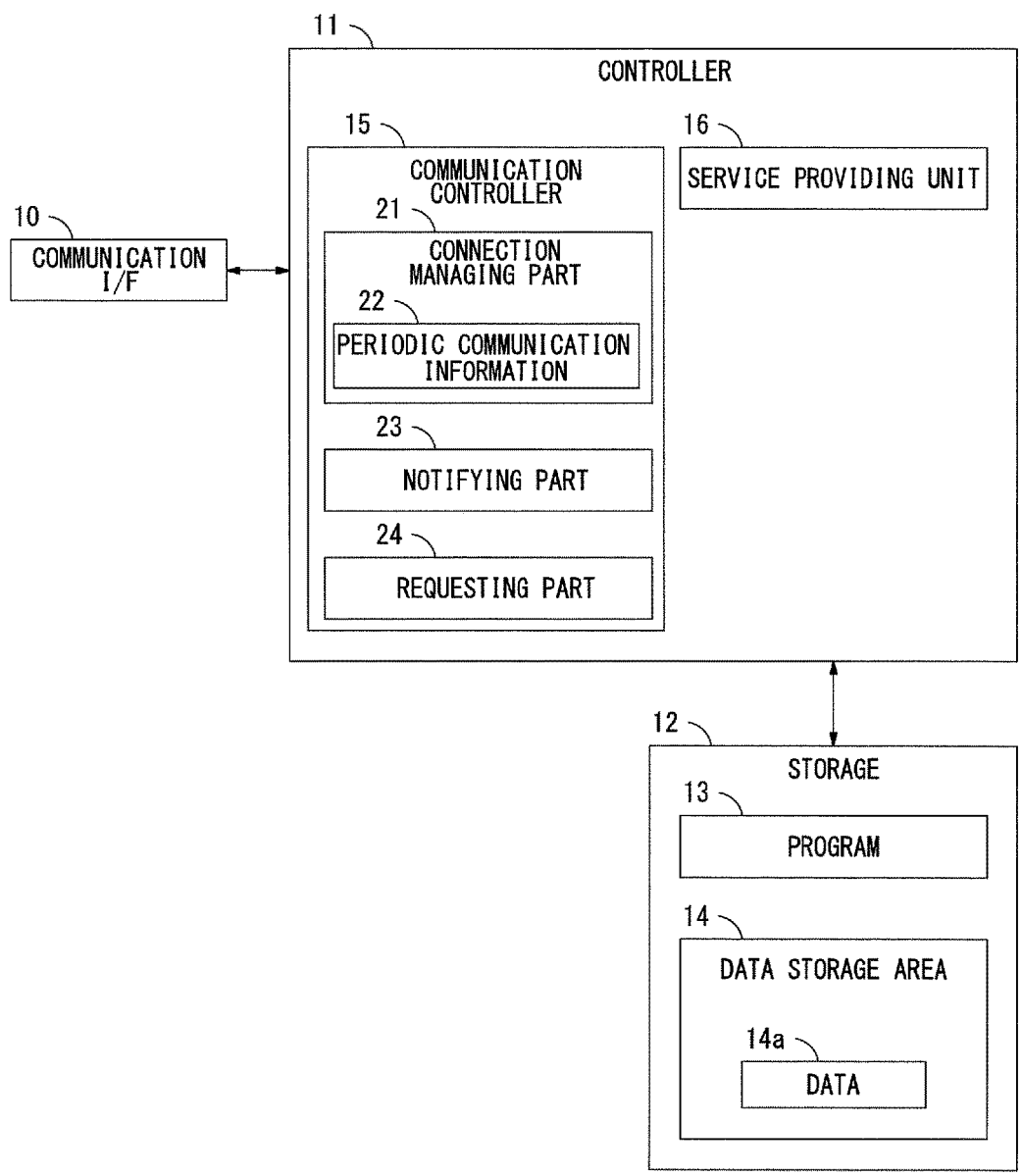
FIG. 2 is a block diagram showing an example of a hardware structure and that of a functional structure of a server.

FIG. 2 is a block diagram showing an example of a hardware structure and that of a functional structure of each server 6a and 6b. As illustrated in FIG. 2, each server 6a and 6b includes a communication interface 10, a controller 11 and a storage 12 as its hardware structure. The communication interface 10 connects the server 6a or 6b to the network and enables the server 6a or 6b to communicate with the image processing device 3 over Internet. The controller 11 includes a CPU and a memory. The controller 11 manages the connection using the XMPP with the image processing device 3 and performs a process to provide the variety of cloud services. The storage 12 is formed from a nonvolatile storage device formed from a device such as a hard disk drive (HDD), for example. A program 13 executed by the CPU of the controller 11 is installed in advance in the storage 12, for instance. The storage 12 includes a data storage area 14 to provide the cloud service. A variety of data 14a including document data, image data and/or the firmware of the image processing device 3 is stored in the data storage area 14.

The CPU executes the program 13 so that the controller 11 serves as a communication controller 15 and a service providing unit 16. The communication controller 15 establishes the connection with the image processing device 3 using the XMPP and manages the connection. The communication controller 15 includes a connection managing part 21, a notifying part 23 and a requesting part 24. The service providing unit 16 provides the cloud service via the communication interface 10. The service providing unit 16, for example, reads the data 14a in the data storage area 14 and generates a print job. The service providing unit 16 then uses the connection established with the image processing device 3 by the communication controller 15 to send the print job to the image processing device 3, thereby enabling the image processing device 3 to execute the print job.

The connection managing part 21 establishes the connection with the image processing device 3 using the XMPP in response to the connection request from the image processing device 3. The connection managing part 21 then communicates with the image processing device 3 on the periodical basis, thereby maintaining the connection. To be more specific, after receiving the connection request from the image processing device 3, the connection managing part 21 establishes the new path using the XMPP to communicate with the image processing device 3 and assigns a unique session ID to the path. The connection managing part 21 notifies the image processing device 3 of the session ID. The connection managing part 21 then communicates with the image processing device 3 using the session ID, thereby effectively maintaining the path established with the image processing device 3. To be more specific, the connection managing part 21 uses the session ID for communication not only for sending and receiving the job to and from the image processing device 3 but also for the periodic communication with the image processing device 3. The connection managing part 21, therefore, maintains the path (connection) established with the image processing device 3.

The connection managing part 21 stores periodic communication information 22 in the memory, for instance, and manages. The periodic communication information 22 is to manage the periodic communication with the image processing device 3. FIG. 3 shows an example of the periodic communication information 22. The periodic communication information 22 includes a periodic communication interval 22a, a timeout period 22b and a changeable range 22c. The time intervals between the periodic communications with the image processing device 3 to maintain the connection with the image processing device 3 is stated as the periodic communication interval 22a. A timing to terminate the connection with the image processing device 3 when the periodic communication from the image processing device 3 is not detected is stated as the timeout period 22b. A range (minimum value and maximum value) within which the time intervals between the periodic communications with the image processing device 3 can be changed is stated as the changeable range 22c. The connection managing part 21 manages the periodic communication with the image processing device 3 based on the periodic communication information 22. In the example of FIG. 3, the periodic communication information 22 includes the periodic communication interval 22a. The periodic communication interval 22a, however, is not always necessary. More specifically, even when the periodic communication interval 22a is stated, the connection managing part 21 effectively maintains the connection with the image processing device 3 until the elapse of the timeout period 22b. After the elapse of the timeout period 22b, the connection managing part 21 discards the session ID and terminates the connection with the image processing device 3. The changeable range 22c is set appropriately for each server 6a and 6b. It is assumed that, for example, the server 6a or 6b is configured not to change the time intervals between the periodic communications. In such a case, the same values are set for the minimum value and the maximum value of the changeable range 22c, for example.

The notifying part 23 becomes operative when the periodic communication with the session ID is received from the image processing device 3 after the connection with the image processing device 3 is terminated by the connection managing part 21. The notifying part 23 sends an error notice showing a timeout error to the image processing device 3.

The requesting part 24 becomes operative if a value of the interval from the receipt of the previous periodic communication to the receipt of the current periodic communication exceeds the minimum value stated as the changeable range 22c when the periodic communication from the image processing device 3 is received before the elapse of the timeout period 22b. The requesting part 24 sends a time change request to request to extend the time interval between the periodic communications to the image processing device 3.

Figure 4:
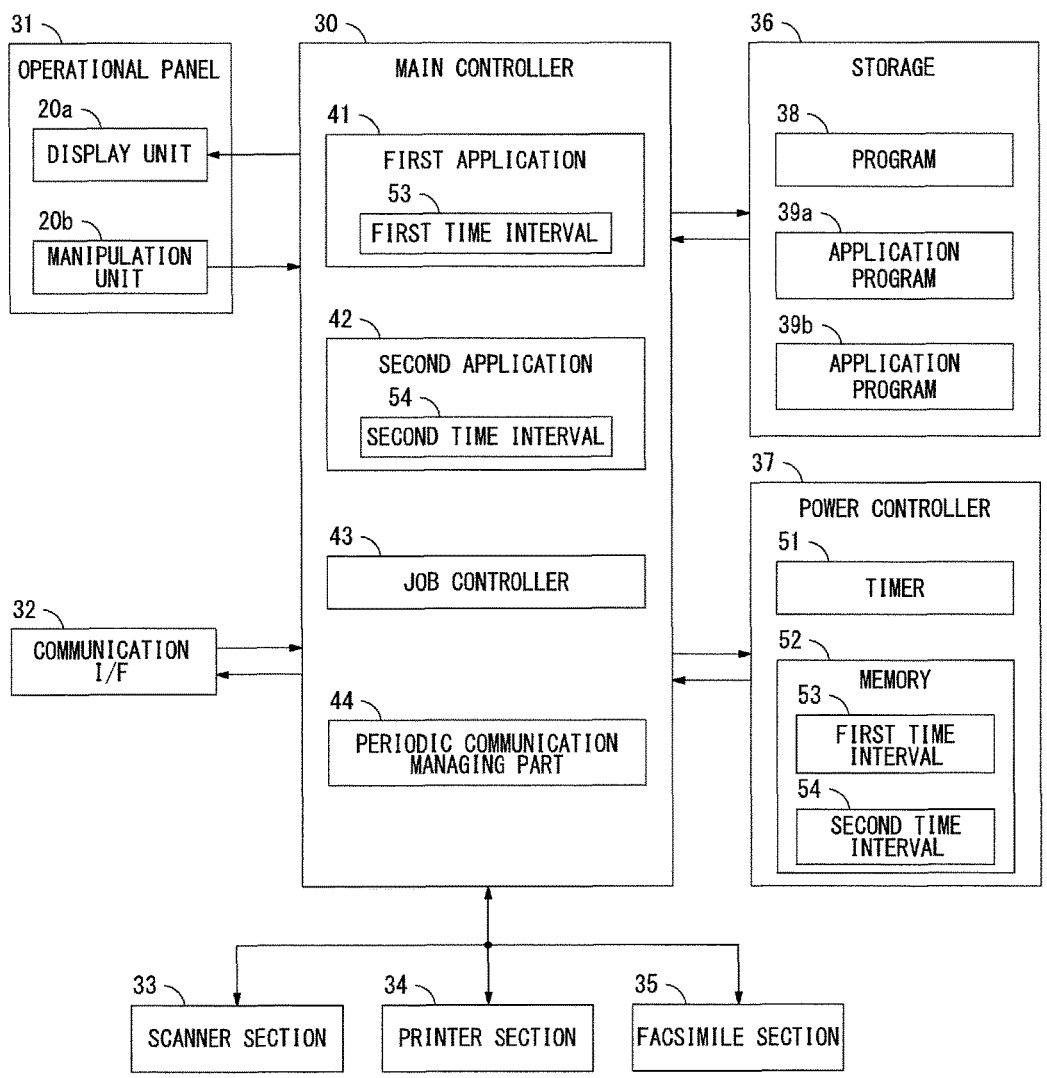
FIG. 4 is a block diagram showing an example of a hardware structure and that of a functional structure of an image processing device.

FIG. 4 is a block diagram showing an example of a hardware structure and that of a functional structure of the image processing device 3. The image processing device 3 includes a main controller 30, an operational panel 31, a communication interface 32, a scanner section 33, a printer section 34, a facsimile section 35, a storage 36 and a power controller 37 as its hardware structure. The main controller 30 controls operations of each processing part and includes a CPU and a memory which are not shown in FIG. 4. The operational panel 31 is a user interface for a user to operate the image processing device 3. The operational panel 31 includes a display unit 20a on which various types of information is displayed to the user and a manipulation unit 20b receives inputs by the user. The communication interface 32 is to connect the image processing device 3 to the local network 2 for communication.

The scanner section 33 optically reads a document placed by the user and generates image data. The printer section 34 forms a toner image based on the image data, transfers the toner image to a printing medium such as a printing sheet, and produces a printed output. The facsimile section 35 sends and receives facsimile data via a phone line which is not shown in FIG. 4.

The storage 36 is formed from a nonvolatile storage device formed from a device such as a hard disk drive (HDD), for example. A variety of programs executed by the CPU of the main controller 30 are stored in the storage 36. A program 38 to be an operating system of the image processing device 3 and application programs 39a and 39b to perform processes worked together with the respective servers 6a and 6b on the cloud 5 are installed in advance in the storage 36.

The power controller 37 controls the sleep function in the image processing device 3. The power controller 37 controls the three steps of power modes of the image processing device 3, for instance, including a normal mode, a sleep mode and a deep sleep mode. The normal mode is a normal power mode that supplies the power to the above-described each processing part. The normal mode enables an execution of the job at the image processing device 3. The sleep mode is the first step of the power-saving state. The image processing device 3 in the normal mode enters the sleep mode when it is not being used for a predetermined period of time. The sleep mode stops the power supply to the display unit 20a of the operational panel 31 and to a fixing heater which is not shown in FIG. 4 included in the printer section 34. The deep sleep mode is the second step of the power-saving state. The image processing device 3 in the sleep mode enters the deep sleep mode when it is not being used for another predetermined period of time. The deep sleep mode stops the power supply to the main controller 30, the display unit 20a of the operational panel 31, the scanner section 33, the printer section 34, the facsimile section 35 and the storage 36. Once the image processing device 3 is in deep sleep mode due to the control by the power controller 37, the main controller 30 stops its function. The image processing device 3 may enter deep sleep mode directly from normal mode without entering sleep mode.

The power controller 37 includes a timer 51. The timer 51 measures a time to enable the image processing device 3 to enter sleep mode or deep sleep mode. The timer 51 also measures a time interval between the periodic communications with each server 6a and 6b during deep sleep mode. It is assumed that a predetermined period of time is measured by the timer 51. In this case, the power controller 37 enables the image processing device 3 in normal mode to enter sleep mode or that in sleep mode to enter deep sleep mode. It is assumed that the predetermined time interval is measured by the timer 51 during deep sleep mode. In this case, the power controller 37 enables the image processing device 3 to be in normal mode. The power controller 37 then puts the image processing device 3 back to the state where the main controller 30 is allowed to establish the periodic communications with the respective servers 6a and 6b.

The power controller 37 includes a memory 52. A first time interval 53 for the image processing device 3 to establish the periodic communication with the first server 6a and a second time interval 54 for the image processing device 3 to establish the periodic communication with the second server 6b are stored in the memory 52. The power controller 37 refers to the first time interval 53 and the second time interval 54 in the memory 52, and wakes the image processing device 3 up from deep sleep mode to normal mode every time the timer 51 measures the time intervals as the image processing device 3 is in deep sleep mode.

After the image processing device 3 is powered on, the CPU of the main controller 30 automatically reads and executes the program 38 in the storage 36. The main controller 30 then serves as a job controller 43 and a periodic communication managing part 44. The job controller 43 controls overall execution of the job at the image processing device 3. The job controller 43 receives an input of the job via the operational panel 31 or the communication interface 32 and puts the scanner section 33, the printer section 34 or the facsimile section 35 into operation, thereby controlling the execution of the received job. When the multiple applications including the first application 41 and the second application 42 are run on the main controller 30, the periodic communication managing part 44 manages the periodic communications with the respective servers 6a and 6b on the cloud 5 established by each of the multiple applications, and controls the periodic communications.

After the program 38 is run, the CPU of the main controller 30 automatically or in response to a user instruction reads and executes the application program 39a in the storage 36. The main controller 30 thus becomes operative as the first application 41. The first application 41 is run to perform the process worked together with the first server 6a on the cloud 5. As being started to run, the first application 41 sends a connection request to the first server 6a and establishes the connection that enables the constant communication with the first server 6a. The first application 41 obtains the session ID from the first server 6a at this time. For communicating with the first server 6a after establishing the connection with the first server 6a, the first application 41 uses the session ID to communicate. In response to receiving the job from the first server 6a using the connection, the first application 41 outputs the received job to the job controller 43. As a result, the job received from the first server 6a can be executed at the image processing device 3.

It is assumed that the job data is not sent or received to and from the first server 6a. In this case, the first application 41 communicates with the first server 6a on the periodical basis at the certain time intervals, thereby maintaining the connection with the first server 6a. The first time interval 53 is set in advance with the first application 41 as the time interval between the periodic communications. The first time interval 53 is the same information as the time interval stated as the periodic communication interval 22a stored in the first server 6a. The first application 41 establishes the periodic communication with the first server 6a based on the first time interval 53. The first application 41, for example, sends an arrive signal with the session ID to the first server 6a, thereby establishing the periodic communication. It is assumed that the first application 41 is allowed to change the first time interval 53. In this case, the first application 41 is configured to receive a setting change of the first time interval 53. If the first application 41 is not allowed to change the first time interval 53, it is configured not to receive the setting change of the first time interval 53.

After the program 38 is run, the CPU of the main controller 30 automatically or in response to a user instruction reads and executes the application program 39b in the storage 36. The main controller 30 thus becomes operative as the second application 42. The second application 42 is run to perform the process worked together with the second server 6b on the cloud 5. As being started to run, the second application 42 sends the connection request to the second server 6b and establishes the connection that enables the constant communication with the second server 6b. The second application 42 obtains the session ID from the second server 6b at this time. For communicating with the second server 6b after establishing the connection with the second server 6b, the second application 42 uses the session ID to communicate. In response to receiving the job from the second server 6b using the connection, the second application 42 outputs the received job to the job controller 43. As a result, the job received from the second server 6b can be executed at the image processing device 3.

It is assumed that the job data is not sent or received to and from the second server 6b. In this case, the second application 42 communicates with the second server 6b on the periodical basis at the certain time intervals, thereby maintaining the connection with the second server 6b. The second time interval 54 is set in advance with the second application 42 as the time interval between the periodic communications. The second time interval 54 is the same information as the time interval stated as the periodic communication interval 22a stored in the second server 6b. The second application 42 establishes the periodic communication with the second server 6b based on the second time interval 54. The second application 42, for example, sends the arrive signal with the session ID to the second server 6b, thereby establishing the periodic communication. It is assumed that the second application 42 is allowed to change the second time interval 54 as well as the first application 41. In this case, the second application 42 is configured to receive the setting change of the second time interval 54. If the second application 42 is not allowed to change the second time interval 54, it is configured not to receive the setting change of the second time interval 54.

After being running on the main controller 30, the first application 41 writes the first time interval 53 between the periodic communications with the first server 6a in the memory 52 of the power controller 37. Also, after being running on the main controller 40, the second application 42 writes the second time interval 54 in the memory 52 of the power controller 37. As a result, the power controller 37 is capable of making the power mode of the image processing device 3 back to normal mode at the time each of the first application 41 and the second application 42 should establish the periodic communication even when the power mode of the image processing device 3 is entered deep sleep mode. The first application 41 and the second application 42 are allowed to establish the periodic communications with the respective servers 6a and 6b at the time the power mode is back to normal mode. The power controller 37 makes the power mode back to normal mode for the periodic communications. The power controller 37 may make the power mode back to sleep mode for the periodic communications instead of normal mode.

As the first application 41 and the second application 42 are running on the main controller 30, the periodic communication managing part 44 performs a process to adjust the time intervals and timings of the periodic communications established by the multiple applications with the respective servers 6a and 6b.

Figure 5:
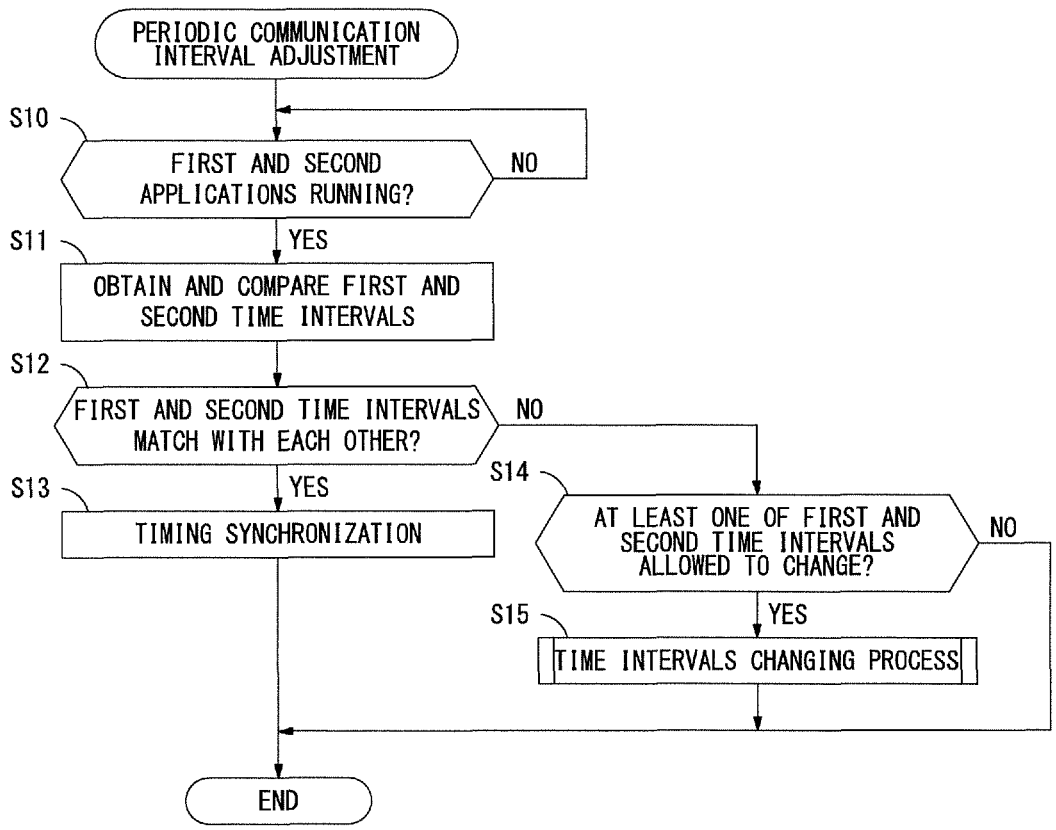
FIG. 5 is a flow diagram explaining an exemplary sequential procedure of a periodic communication interval adjustment performed by a periodic communication managing part.
Figure 6:
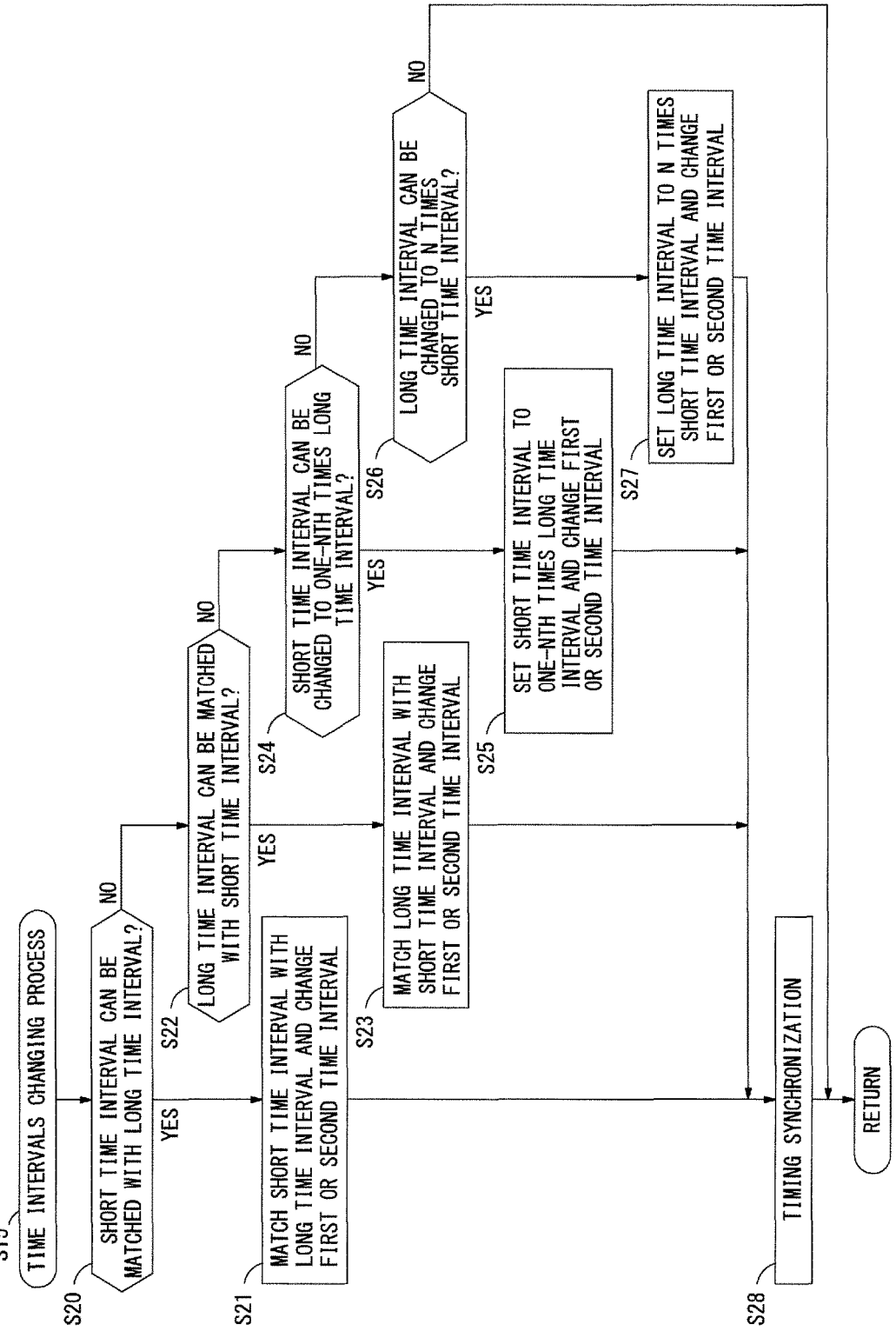
FIG. 6 is a flow diagram explaining an exemplary sequential procedure of a time interval changing process in detail.
Figure 7:
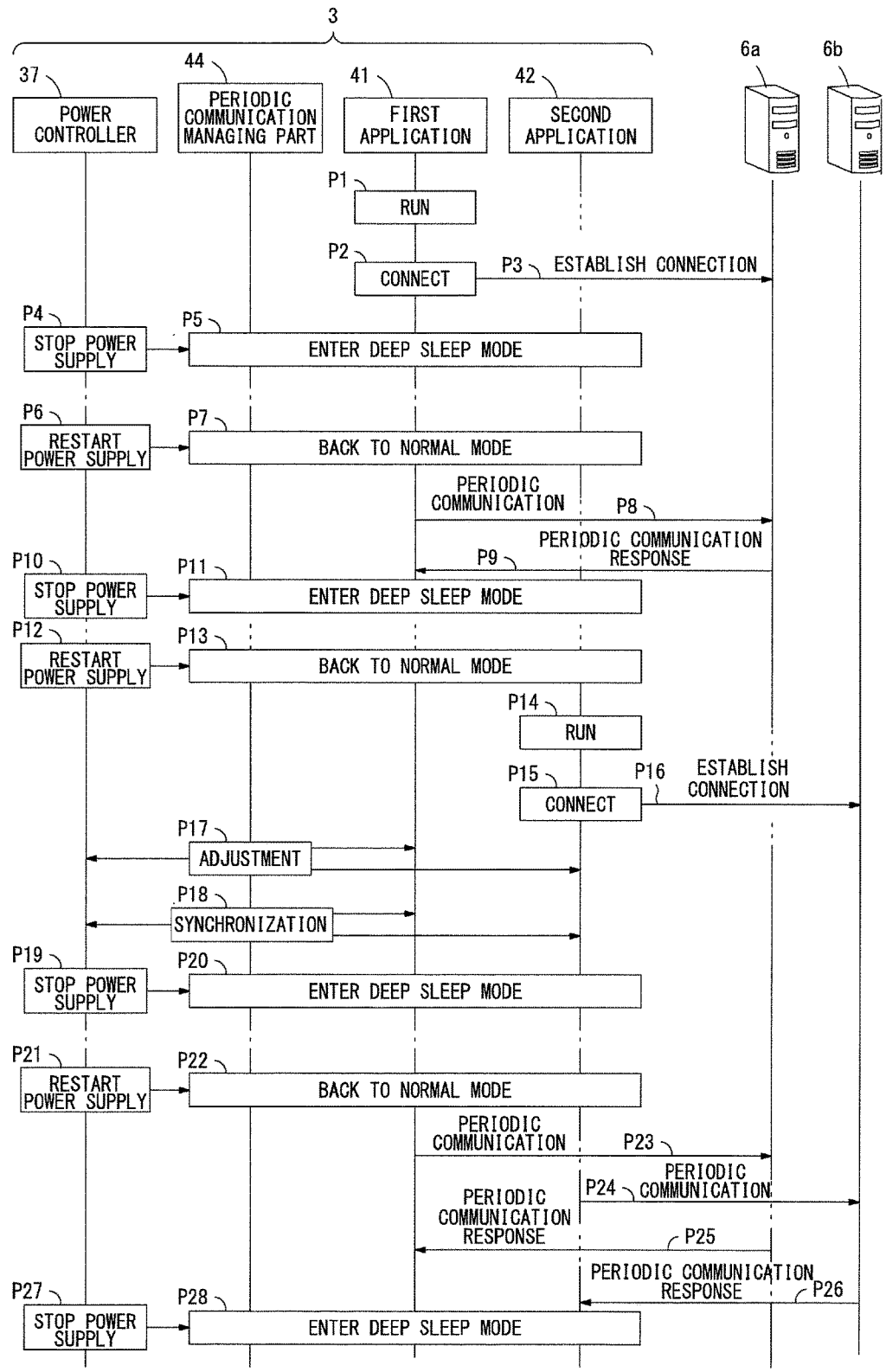
FIG. 7 is a flow diagram explaining an exemplary overall procedure of a process at the image processing system.

FIGS. 5 and 6 are flow diagrams explaining exemplary sequential procedures of a periodic communication interval adjustment performed by the periodic communication managing part 44. Upon start of the process, the periodic communication managing part 44 waits until both of the first application 41 and the second application 42 start to run on the main controller 30 (step S10). After the first application 41 and the second application 42 start to run (when a result of step S10 is YES), the periodic communication managing part 44 obtains the first time interval 53 and the second time interval 54 from the respective first application 41 and second application 42, and compares them (step S11). The periodic communication managing part 44 determines whether or not the first time interval 53 and the second time interval 54 match with each other (step S12). It is assumed that the first time interval 53 and the second time interval 54 match with each other (when a result of step S12 is YES). In this case, the periodic communication managing part 44 performs a timing synchronization to synchronize the timing of the periodic communication by the first application 41 with the first server 6a and the timing of the periodic communication by the second application 42 with the second server 6b (step S13). In this timing synchronization, one of the first application 41 and the second application 42 gives an instruction on the periodic communication to another one of the first application 41 and the second application 42 when it establishes the periodic communication, thereby forcing another one of the first application 41 and the second application 42 to establish the periodic communication. As a result of this timing synchronization, the first application 41 and the second application 42 are allowed to establish the periodic communications at the same time after the synchronization.

It is assumed that the first time interval 53 and the second time interval 54 do not match with each other (when a result of step S12 is NO). In this case, the periodic communication managing part 44 confirms if at least one of the first time interval 53 and the second time interval 54 is allowed to be changed (step S14). At least one of the first time interval 53 and the second time interval 54 may be changed (when a result of step S14 is YES). The periodic communication managing part 44 then performs a time interval changing process (step S15). In the time interval changing process (step S15), one or both of the first time interval 53 and the second time interval 54 are changed. Also, in the time interval changing process (step S15), the timing of the periodic communication by the first application 41 with the first server 6a and the timing of the periodic communication by the second application 42 with the second server 6b are synchronized. When none of the first time interval 53 and the second time interval 54 is allowed to be changed (when a result of step S14 is NO), the time intervals cannot be adjusted. The time interval changing process thus completes.

FIG. 6 is a flow diagram explaining an exemplary sequential procedure of the time interval changing process (step S15) in detail. Upon start of the process, the periodic communication managing part 44 determines if the short time interval of the first time interval 53 and the second time interval 54 is allowed to be matched with the long time interval (step S20). This determination is made by confirming whether or not the short time interval of the first time interval 53 and the second time interval 54 is allowed to change, for example. The short time interval may be allowed to change, and the short time interval may be matched with the long time interval (when a result of step S20 is YES). In such a case, the periodic communication managing part 44 changes the short time interval of the first time interval 53 and the second time interval 54 to match with the long time interval (step S21). It is assumed, for example, 5 minutes is initially set as the first time interval 53, and 10 minutes is initially set as the second time interval 54. In such a case, the periodic communication managing part 44 changes the first time interval 53 to 10 minutes which is equal to the second time interval 54. As described above, the first time interval 53 may be changed to match with the second time interval 54. The periodic communication managing part 44 then gives an instruction to the first application 41 to change the first time interval 53, and updates the first time interval 53 in the memory 52 of the power controller 37 to the changed value. If the second time interval 54 is changed to match with the first time interval 53, the periodic communication managing part 44 gives the instruction to the second application 42 to change the second time interval 54, and updates the second time interval 54 in the memory 52 of the power controller 37 to the changed value.

The short time interval of the first time interval 53 and the second time interval 54 may not be allowed to change, and the short time interval cannot be matched with the long time interval (when a result of step S20 is NO). In such a case, the periodic communication managing part 44 determines if the long time interval of the first time interval 53 and the second time interval 54 is allowed to match with the short time interval (step S22). This determination is made by confirming whether or not the long time interval of the first time interval 53 and the second time interval 54 is allowed to change, for example. The long time interval may be allowed to change, and the long time interval can be matched with the short time interval (when a result of step S22 is YES). In such a case, the periodic communication managing part 44 changes the long time interval of the first time interval 53 and the second time interval 54 to match with the short time interval (step S23). It is assumed, for example, 5 minutes is initially set as the first time interval 53, and 10 minutes is initially set as the second time interval 54. In such a case, the periodic communication managing part 44 changes the second time interval 54 to 5 minutes which is equal to the first time interval 53. As described above, the periodic communication managing part 44 gives the instruction to the first application 41 or the second application 42 to change the first time interval 53 or the second time interval 54, and updates the first time interval 53 or the second time interval 54 in the memory 52 of the power controller 37 to the changed value.

The first and the second applications 41 and 42 may store in advance the same information as the changeable range 22c registered with the periodic communication information 22 in the respective servers 6a and 6b. In this case, the first and the second applications 41 and 42 do not receive the change to the time interval which is out of the changeable range 22c stated in advance with the respective servers 6a and 6b. Hence, even when the periodic communication managing part 44 tries to change the short time interval of the first time interval 53 and the second time interval 54 to the long time interval or the long time interval to the short time interval, it may not make such a change. The long time interval may not be allowed to match with the short time interval (when a result of step S22 is NO). In such a case, the periodic communication managing part 44 determines if it is allowed to change the short time interval of the first time interval 53 and the second time interval 54 to one-Nth times the long time interval (N is a counting number) (step S24). When the short time interval may be changed to one-Nth times the long time interval (step S24 is YES), the periodic communication managing part 44 changes the short time interval to one-Nth times the long time interval (step S25). It is assumed, for example, 5 minutes is initially set as the first time interval 53, and 12 minutes is set as the second time interval 54. In such a case, the periodic communication managing part 44 changes the first time interval 53 to 6 minutes which is one-half of the second time interval 54. As described above, the periodic communication managing part 44 gives the instruction to the first application 41 or the second application 42 to change the first time interval 53 or the second time interval 54, and updates the first time interval 53 or the second time interval 54 in the memory 52 of the power controller 37 to the changed value.

When the short time interval of the first time interval 53 and the second time interval 54 may not be changed to one-Nth times the long time interval (when a result of step S24 is NO), the periodic communication managing part 44 determines if it is allowed to change the long time interval of the first time interval 53 and the second time interval 54 to N times the short time interval (N is a counting number) (step S26). The long time interval may be changed to N times the short time interval (when a result of step S26 is YES). In this case, the periodic communication managing part 44 changes the long time interval to N times the short time interval (step S27). It is assumed, for example, 5 minutes is initially set as the first time interval 53, and 12 minutes is initially set as the second time interval 54. In such a case, the periodic communication managing part 44 changes the second time interval 54 to 10 minutes which is the twice length of the short time interval 53. As described above, the periodic communication managing part 44 gives the instruction to the first application 41 or the second application 42 to change the first time interval 53 or the second time interval 54, and updates the first time interval 53 or the second time interval 54 in the memory 52 of the power controller 37 to the changed value.

The periodic communication managing part 44 then performs the timing synchronization (step S28). This timing synchronization is the same process as that in step S13 as described above. Hence, the first application 41 and the second application 42 are allowed to establish the periodic communications at the same timings.

It is assumed that the short time interval may not be allowed to change to one-Nth times the long time interval and the long time interval may not be allowed to change to N times the short time interval (when a result of step S26 is NO). In such a case, the appropriate timings for each of the first and second applications 41 and 42 to simultaneously establish the periodic communications cannot be set. The periodic communication interval adjustment, therefore, completes.

The periodic communication managing part 44 performs the above-described process as the image processing device 3 is in normal mode so that the first time interval 53 and the second time interval 54 adjusted to have each of the first and second applications establish the periodic communication at the same time are stored in the memory 52 of the power controller 37. The power controller 37 may enable the image processing device 3 to be back to normal mode for the periodic communications with the servers 6a and 6b after from deep sleep mode after entering the image processing device 3 to deep sleep mode. Each of the first and second applications 41 and 42 is allowed to establish the periodic communication with the respective servers 6a and 6b at the same timing.

FIG. 6 is a flow diagram explaining an exemplary overall procedure of a process at the image processing system 1. Once the first application 41 runs in the image processing device 3 (process P1), the first application 41 connects to the first server 6a (process P2), and establishes the connection with the first server 6a (process P3). It is assumed that it lasts for the predetermined period of time as the image processing device 3 is not being used. In this case, the power controller 37 stops the power supply to the main controller 30 (process P4), and enables the image processing device 3 to enter deep sleep mode (process P5). At this time, the power controller 37 activates the timer 51, and monitors if the elapsed time after the previous periodic communication between the first application 41 and the first server 6a has been equal to the first time interval 53. The power controller 37 may detect that the elapsed time after the previous periodic communication between the first application 41 and the first server 6a has been equal to the first time interval 53. The power controller 37 then restarts the power supply to the main controller 30 (process P6), and enables the image processing device 3 to back to normal mode (process P7). After the image processing device 3 is back to normal mode, the first application 41 establishes the periodic communication with the first server 6a (process P8). When receiving the normal periodic communication from the image processing device 3 as the connection with the image processing device 3 is maintained, the first server 6a replies a periodic communication response to the periodic communication (process P9). The connection between the image processing device 3 and the first server 6a is thus maintained successfully. As the periodic communication by the first application 41 completes, the power controller 37 stops again the power supply to the main controller 30 (process P10), and enables the image processing device 3 to enter deep sleep mode (process P11).

If the user operates the operational panel 31, for instance, the power controller 37 restarts the power supply to the main controller 30 (process P12), and enables the image processing device 3 to back to normal mode (process P13). Once the second application 42 runs in the image processing device 3 in response to the user instruction (process P14), the second application 42 connects to the second server 6b (process P15), and establishes the connection with the second server 6b (process P16).

After the first and the second applications 41 and 42 start to run, the periodic communication managing part 44 performs the process to adjust the first time interval 53 and the second time interval 54 (process P17) and the process to synchronize the timings of the periodic communications established by the respective first and the second applications 41 and 42 (process P18). The periodic communication managing part 44 performs the process to update the first time interval 53 or the second time interval 54 to the changed value, and notifies the power controller 37 of the timings of the periodic communications established by the respective first and the second applications 41 and 42.

It is assumed that it lasts for the predetermined period of time as the image processing device 3 is not being used. In this case, the power controller 37 stops the power supply to the main controller 30 (process P19), and enables the image processing device 3 to enter deep sleep mode (process P20). At this time, the power controller 37 activates the timer 51, and monitors if the elapsed time after the previous periodic communication between the first application 41 and the first server 6a or the second application 42 and the second server 6b has been equal to the first time interval 53 or the second time interval 54. The power controller 37 may detect that the elapsed time after the previous periodic communication between the first application 41 and the first server 6a or the second application 42 and the second server 6b has been equal to the first time interval 53 or the second time interval 54. The power controller 37 then restarts the power supply to the main controller 30 (process P21), and enables the image processing device 3 to back to normal mode (process P22). After the image processing device 3 is back to normal mode, the first application 41 establishes the periodic communication with the first server 6a (process P23). Almost at the same time, the second application 42 establishes the periodic communication with the second server 6b (process P24). The first server 6a replies the periodic communication response to the periodic communication from the first application 41 (process P25), and the second server 6b replies the periodic communication response to the periodic communication from the second application 42 (process P26). To be more specific, the first application 41 and the second application 42 establish the periodic communications at the same time, and the connection between the image processing device 3 and the first server 6a and that between the image processing device 3 and the second server 6b are maintained successfully. As the periodic communications by the first application 41 and the second application 42 complete, the power controller 37 stops again the power supply to the main controller 30 (process P27), and enables the image processing device 3 to enter deep sleep mode (process P28).

FIGS. 8A and 8B show timings for the first application 41 and the second application 42 to establish the periodic communications. In the example of FIGS. 8A and 8B, Ta (minutes) is set in advance as the first time interval 53 which is the time interval between the periodic communications by the first application 41, and Tb (minutes) is set as the second time interval 54 which is the time interval between the periodic communications by the second application 42. Tb is greater than Ta. FIG. 8A shows an example when the short time interval Ta is matched with the long time interval Tb, and FIG. 8B shows an example when the long time interval Tb is matched with the short time interval Ta.

The example when the short time interval Ta is matched with the long time interval Tb is explained first. As shown in FIG. 8A, the first application 41 is started to run at time T10. The first application 41 establishes the connection with the first server 6a, then establishes the periodic communication with the first server 6a at time T11 which is after the elapse of the first time interval Ta. The image processing device 3 enters deep sleep mode from normal mode at time T12. The image processing device 3 is powered back on and is put back to normal mode at T13 which is after the elapse of the first time interval Ta from the previous periodic communication by the first application 41. After the first application 41 establishes the periodic communication, the image processing device 3 enters again deep sleep mode.

The image processing device 3 is powered back on and is put back to normal mode at T14, and the second application 42 is started to run. The second application 42 then establishes the connection with the second server 6b. The periodic communication managing part 44 becomes operative at the image processing device 3 to match the short time interval Ta of the first time interval Ta and the second time interval Tb with the long time interval Tb. Also, the periodic communication managing part 44 performs the process to synchronize the timings for the first application 41 and the second application 42 to establish the periodic communications. After the second application 42 start to run, the first time interval between the periodic communications by the first application 41 with the first server 6a is changed to Tb from Ta.

After the second application 42 start to run, the image processing device 3 may enter again deep sleep mode. The image processing device 3 is then powered back on and is put back to normal mode at T15 which is after the elapse of the second time interval Tb from the previous periodic communication (time T13) by the first application 41. After the first application 41 and the second application 42 establish the periodic communications almost at the same time, the image processing device 3 enters again deep sleep mode. The image processing device 3 is then powered back on and is put back to normal mode on a periodical basis at the second time intervals Tb to enable the first application 41 and the second application 42 to establish the periodic communications almost at the same time.

As described above, the short time interval Ta is matched with the long time interval Tb. The interval at which the image processing device 3 is back to normal mode extends so that the image processing device 3 is allowed to be in deep sleep mode for a long time. Hence, by matching the short time interval Ta with the long time interval Tb, a great power saving effect can be obtained.

The example when the long time interval Tb is matched with the short time interval Ta is explained next. As shown in FIG. 8B, the first application 41 is started to run at time T20. The timings after the first application 41 is started to run at time T20 to the second application 42 is started to run at time T24 are the same as the above-described timings T10 to T14. After running the second application 42 at time T24, the periodic communication managing part 44 becomes operative at the image processing device 3 to match the long time interval Tb of the first time interval Ta and the second time interval Tb with the short time interval Ta. Also, the periodic communication managing part 44 performs the process to synchronize the timings for the first application 41 and the second application 42 to establish the periodic communications. After the second application 42 starts to run, the second time interval between the periodic communications by the second application 42 with the second server 6b is changed to Ta from Tb.

After the second application 42 starts to run, the image processing device 3 may enter again deep sleep mode. The image processing device 3 is then powered back on and is put back to normal mode at T25 which is after the elapse of the first time interval Ta from the previous periodic communication (time T23) by the first application 41. After the first application 41 and the second application 42 establish the periodic communications almost at the same time, the image processing device 3 enters again deep sleep mode. The image processing device 3 is then powered back on and is put back to normal mode on the periodical basis at the first time intervals Ta to enable the first application 41 and the second application 42 to establish the periodic communications almost at the same time.

As described above, the long time interval Tb is matched with the short time interval Ta. The interval at which the image processing device 3 is back to normal mode is shortened so that the image processing device 3 is not allowed to be in deep sleep mode for a long time. Instead of matching the long time interval Tb with the short time interval Ta, the short time interval Ta is matched with the long time interval Tb.

It is assumed that the first and the second applications 41 and 42 do not store in advance the same information as the changeable range 22c in the periodic communication information 22 in the respective servers 6a and 6b. In this case, the periodic communication managing part 44 is not allowed to find that changes of the time interval between the periodic communications at the server 6a and the server 6b are restricted. The periodic communication managing part 44, therefore, sometimes changes the first time interval or the second time interval out of the changeable range 22c of the server 6a and the server 6b.

As shown in FIG. 8A, the short time interval Ta is changed to match with the long time interval Tb. The changed value then extends the timeout period 22b set in advance with the first server 6a. A case where the first application 41 establishes the periodic communication with the first server 6a after the connection between the image processing device 3 and the first server 6a is terminated occurs. In such a case, the first application 41 receives an error notice that shows a timeout error from the first server 6a instead of the normal periodic communication response. This error notice is not always received from the first server 6a. It may be received from the communication relay device 4 if the connection is terminated by the communication relay device 4. By receiving the error notice, the first application 41 is allowed to find out that the connection with the first server 6a has already been terminated. The first application 41 notifies the periodic communication managing part 44 of the receipt of the error notice and sends the connection request to the first server 6a to establish the connection with the first server 6a again. As finding that the first application 41 has received the error notice from the first server 6a, the periodic communication managing part 44 readjusts the first time interval or the second time interval.

Figure 9:
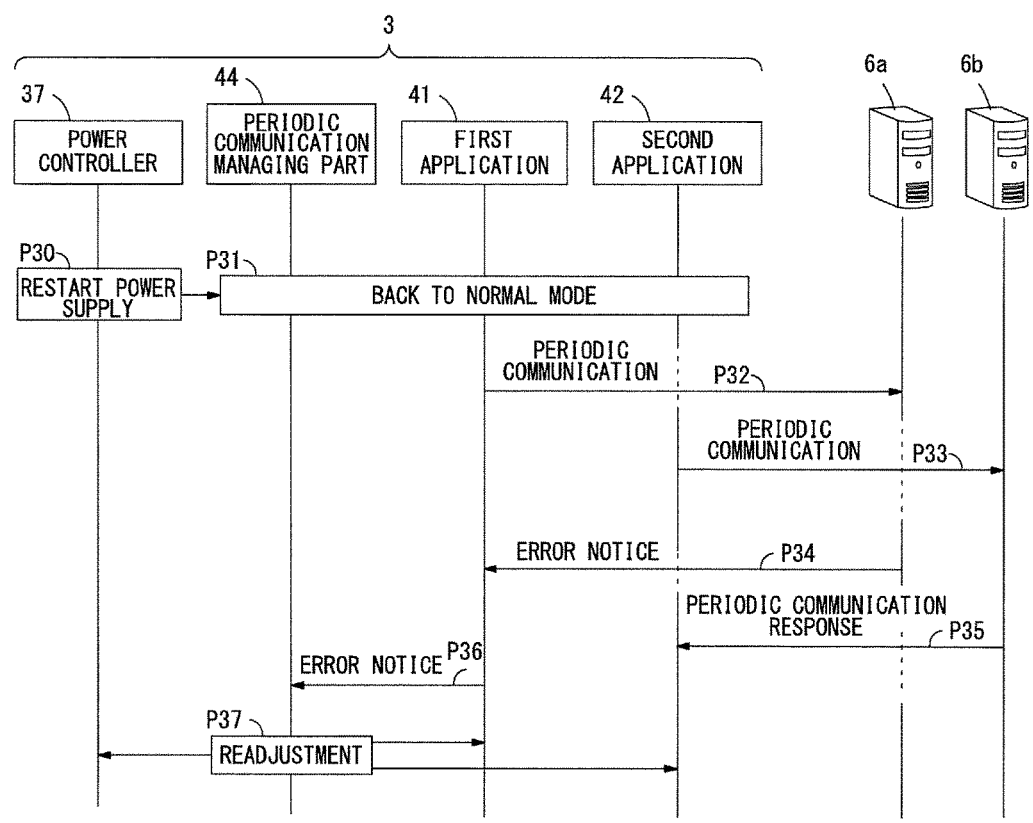
FIG. 9 is a flow diagram explaining an exemplary procedure of a process performed when the first application receives an error notice.

FIG. 9 is a flow diagram explaining an exemplary procedure of a process performed when the first application 41 receives the error notice. As shown in FIG. 9, if it is the time for the first application 41 and the second application 42 to establish the periodic communications as the image processing device 3 is in deep sleep mode, the power controller 37 restarts the power supply to the main controller 30 (process P30), and powers the image processing device 3 back on to put it back in normal mode (process P31). After the image processing device 3 is powered back on and back in normal mode, the first application 41 establishes the periodic communication with the first server 6a (process P32). Almost at the same time, the second application 42 establishes the periodic communication with the second server 6b (process P33). The first application 41 receives the error notice as a response to the periodic communication (process P34). In the example of FIG. 9, the second application 42 receives the normal periodic communication response as the response to the periodic communication (process P35). In response to receiving the error notice as the response to the periodic communication, the first application 41 outputs the received error notice to the periodic communication managing part 44 (process P36). After receiving the error notice, the periodic communication managing part 44 readjusts the first time interval or the second time interval while the image processing device 3 is in normal mode. The periodic communication managing part 44 then notifies the first application 41, the second application 42 and the power controller 37 of the readjusted first and second time intervals (process P37).

Figure 10:
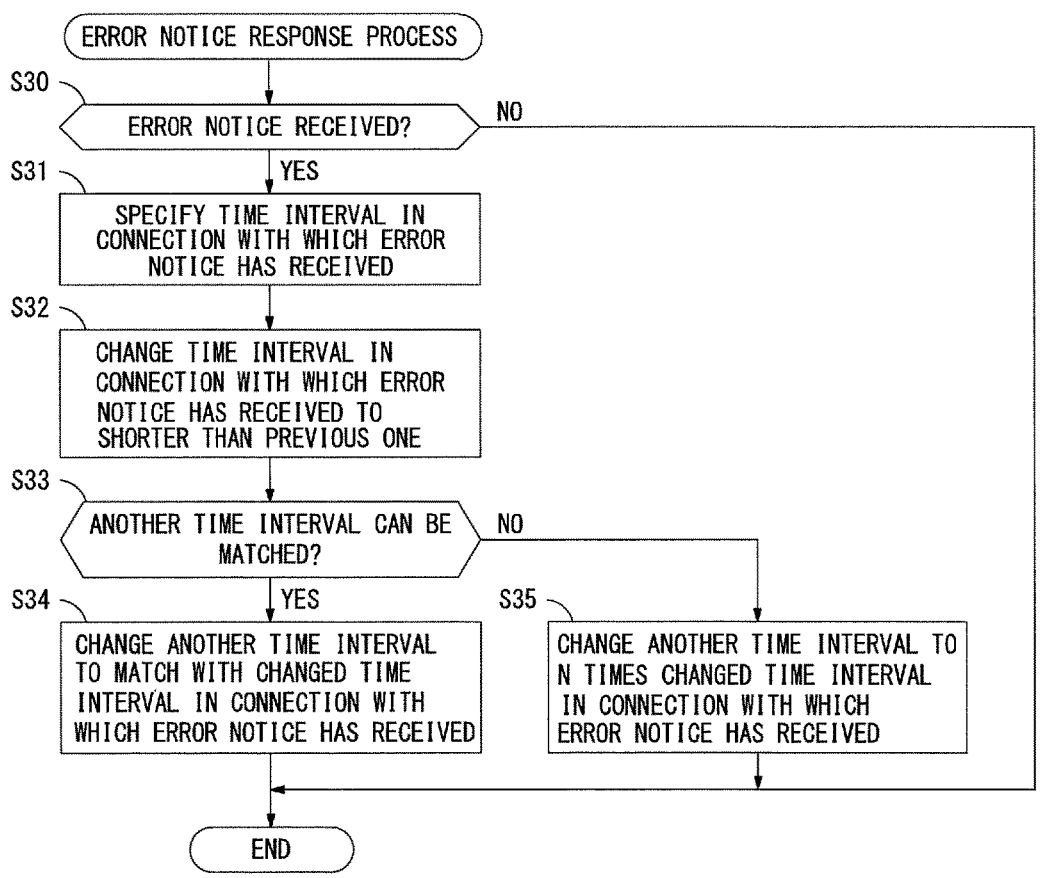
FIG. 10 is a flow diagram explaining an exemplary sequential procedure of an error notice response process to readjust in response to the error notice.

FIG. 10 is a flow diagram explaining an exemplary sequential procedure of an error notice response process to readjust in response to the error notice. Upon start of the process, the periodic communication managing part 44 determines whether or not the error notice is received (step S30). If the error notice is not received (when a result of step S30 is NO), the process completes. If the error notice is received (when a result of step S30 is YES), the periodic communication managing part 44 specifies that the error notice has received in connection with which one of the first time interval 53 and the second time interval 54 (step S31). The periodic communication managing part 44 changes the time interval in connection with which the error notice has been received to the shorter time interval than the previous one (step S32). As a result, the possibility of the occurrence of the timeout error from the next periodic communication may be decreased.

The periodic communication managing part 44 then determines if another one of the time intervals which is different from the one in connection with which the error notice has been received is allowed to match with the short time interval which is changed in step S32 (step S33). Another time interval may be matched with the changed short time interval (when a result of step S33 is YES). In this case, the periodic communication managing part 44 changes another time interval to match with the changed value of the time interval in connection with which the error notice has been received (step S34). As a result, the first and the second applications 41 and 42 are allowed to establish the periodic communications at the same time from the next periodic communications.

Another time interval may not be matched with the changed short time interval (when a result of step S33 is NO). In this case, the periodic communication managing part 44 changes another time interval to match with the value which is N times (N is a counting number equal to or more than 2) the changed time interval in connection with which the error notice has been received (step S35). As a result, the first and the second applications 41 and 42 are allowed to establish the periodic communications at the same time from the next periodic communications once in multiple times.

Another time interval may not be changed. In this case, when the periodic communication managing part 44 changes the time interval in connection with which the error notice has been received to the shorter time interval than the previous one, it may change to one-Nth times another time interval. As a result, the first and the second applications 41 and 42 are allowed to establish the periodic communications at the same time from the next periodic communications once in multiple times.

As shown in FIG. 8B, the long time interval Tb is changed to match with the short time interval Ta, for instance. The interval between the periodic communications between the second application 42 and the second server 6b may exceed the minimum value set in advance as the changeable range 22c. In such a case, the second server 6b is required to often perform the response process to the periodic communication, resulting in increase in load on the second server 6b. The process to provide the services may not be performed efficiently. Hence, the second server 6b then sends a time change request to request to extend the time interval between the periodic communications to the image processing device 3. With the receipt of the time change request, the second application 42 finds that the interval between the periodic communications with the second server 6b is too short. The second application 42 then notifies the periodic communication managing part 44 of the receipt of the time change request. After being notified that the second application 42 has received the time change request from the second server 6b, the periodic communication managing part 44 readjusts the first time interval or the second time interval.

Figure 11:
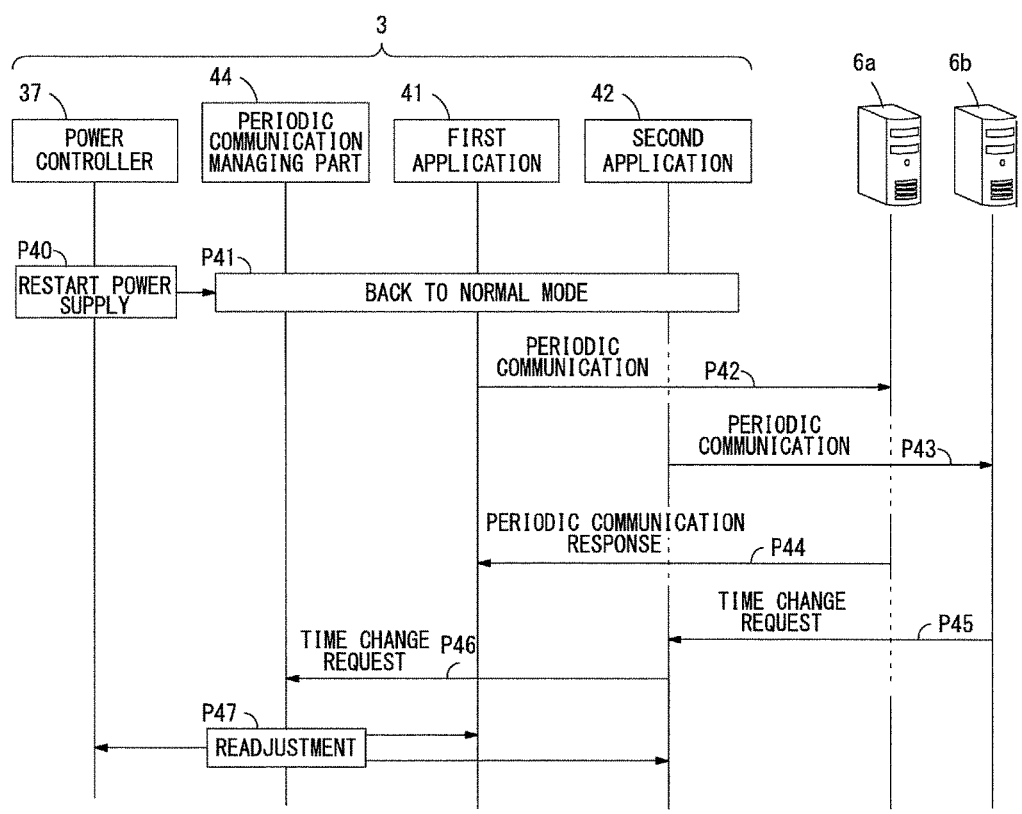
FIG. 11 is a flow diagram explaining an exemplary procedure of a process performed when the second application receives a time change request.

FIG. 11 is a flow diagram explaining an exemplary procedure of a process performed when the second application 42 receives the time change request. As shown in FIG. 11 if it is the time for the first application 41 and the second application 42 to establish the periodic communications as the image processing device 3 is in deep sleep mode, the power controller 37 restarts the power supply to the main controller 30 (process P40), and powers the image processing device 3 back on to put it back in normal mode (process P41). The first application 41 establishes the periodic communication with the first server 6a (process P42), and the second application 42 establishes the periodic communication with the second server 6b (process P43). The first application 41 receives the normal periodic communication response as the response to the periodic communication (process P44). The second application 42 receives the time change request as the response to the periodic communication (process P45). In response to receiving the time change request as the response to the periodic communication, the second application 42 outputs the received time change request to the periodic communication managing part 44 (process P46). After receiving the time change request, the periodic communication managing part 44 readjusts the first time interval or the second time interval while the image processing device 3 is in normal mode. The periodic communication managing part 44 then notifies the first application 41, the second application 42 and the power controller 37 of the readjusted first time interval and second time interval (process P47).

Figure 12:
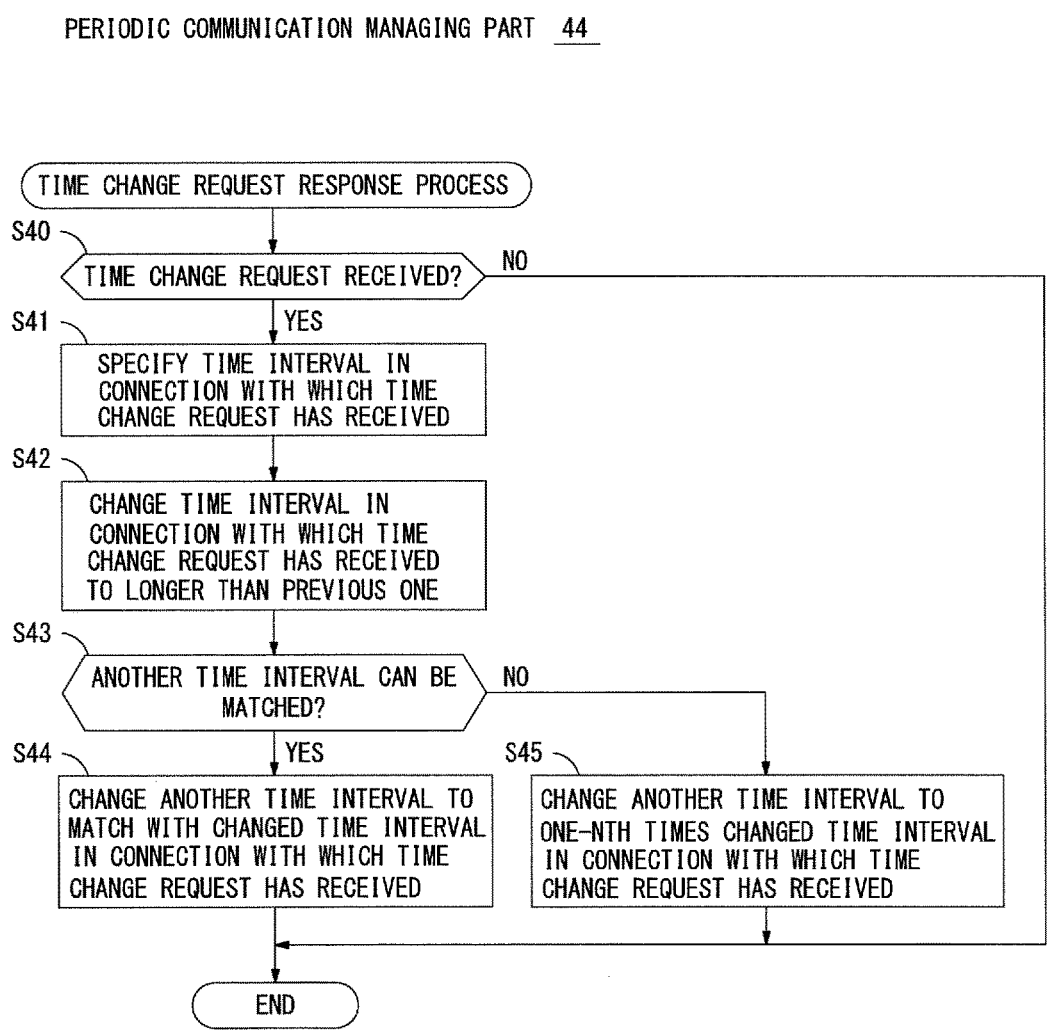
FIG. 12 is a flow diagram explaining an exemplary sequential procedure of a time change request response process to readjust in response to the time change request.

FIG. 12 is a flow diagram explaining an exemplary sequential procedure of a time change request response process to readjust in response to the time change request. Upon start of the process, the periodic communication managing part 44 determines whether or not the time change request is received (step S40). If the time change request is not received (when a result of step S40 is NO), the process completes. If the time change request is received (when a result of step S40 is YES), the periodic communication managing part 44 specifies that the time change request has received in connection with which one of the first time interval 53 and the second time interval 54 (step S41). The periodic communication managing part 44 changes the time interval in connection with which the time change request has been received to the longer time interval than the previous one (step S42). As a result, the possibility of the receipt of the time change request from the server 6a or 6b from the next periodic communication may be decreased.

The periodic communication managing part 44 determines if another one of the time intervals which is different from the one in connection with which the time change request has been received is allowed to match with the long time interval which is changed in step S42 (step S43). Another time interval may be matched with the changed long time interval (when a result of step S43 is YES). In this case, the periodic communication managing part 44 changes another time interval to match with the changed value of the time interval in connection with which the time change request has been received (step S44). As a result, the first and the second applications 41 and 42 are allowed to establish the periodic communications at the same time from the next periodic communications.

Another time interval may not be matched with the changed long time interval (when a result of step S43 is NO). In this case, the periodic communication managing part 44 changes another time interval to match with the value which is one-Nth times (N is a counting number equal to or more than 2) the changed time interval in connection with which the time change request has been received (step S45). As a result, the first and the second applications 41 and 42 are allowed to establish the periodic communications at the same time from the next periodic communications once in multiple times.

Another time interval may not be changed. In this case, when the periodic communication managing part 44 changes the time interval in connection with which the time change request has been received to the longer time interval than the previous one in step S42, it may change N times another time interval. As a result, the first and the second applications 41 and 42 are allowed to establish the periodic communications at the same time from the next periodic communications once in multiple times.

Figure 13A:
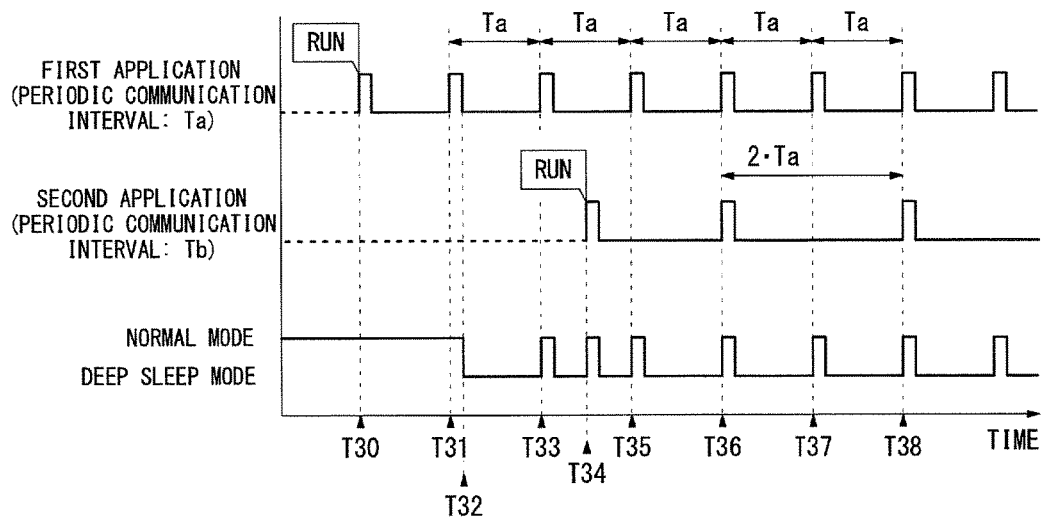
FIGS. 13A and 13B show timings when the periodic communication is established by changing one of time intervals to N times or one-Nth times another time interval.
Figure 13B:
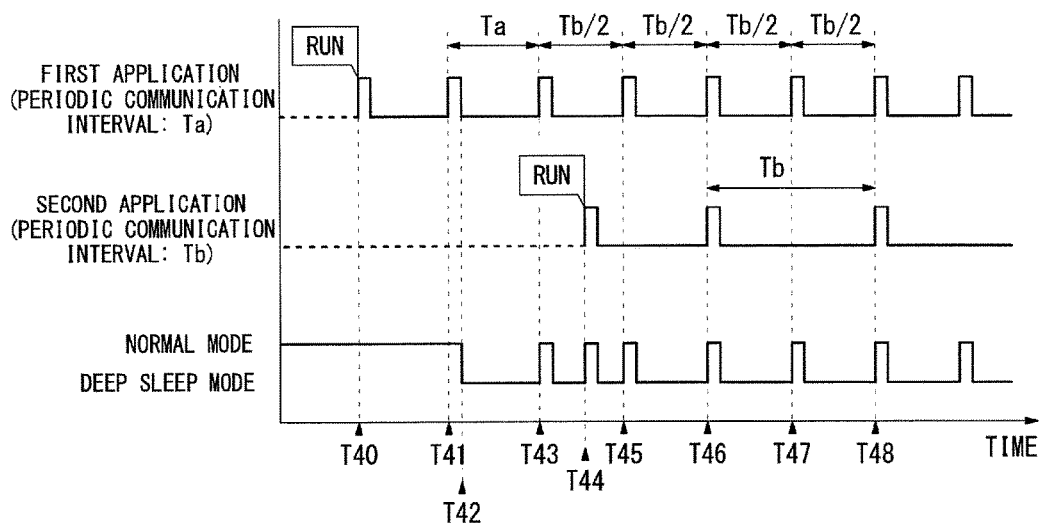

FIGS. 13A and 13B show timings when the periodic communication is established by changing one of the time intervals to N times or one-Nth times another time interval. In the examples of FIGS. 13A and 13B, Ta (minutes) is set as the first time interval 53 which is the interval between the periodic communications by the first application 41, and Tb (minutes) is set as the second time interval 54 which is the interval between the periodic communications by the second application 42. Tb is greater than Ta. FIG. 13A shows an example when the second time interval Tb is changed to twice the first time interval Ta. FIG. 13B shows an example when the first time interval Ta is changed to one-half of the second time interval Tb.

The example when the second time interval Tb is changed to twice the first time interval Ta is explained first. As shown in FIG. 13A, the first application 41 is started to run at time T30. The first application 41 establishes the connection with the first server 6a, then establishes the periodic communication with the first server 6a at T31 after the elapse of the first time interval Ta. The image processing device 3 enters deep sleep mode from normal mode at time T32. The image processing device 3 is powered back on and the power mode of the image processing device 3 is put back to normal mode at T33 which is after the elapse of the first time interval Ta from the previous periodic communication established by the first application 41. The image processing device 3 enables the first application 41 to establish the periodic communication, then enters again deep sleep mode.

The image processing device 3 is powered back on and is back to normal mode at T34. After the second application 42 starts to run, it establishes the connection with the second server 6b. The periodic communication managing part 44 becomes operative at the image processing device 3 at this time. The periodic communication managing part 44 changes the long time interval Tb to twice the short time interval Ta of the first time interval Ta and the second time interval Tb. Also, the periodic communication managing part 44 synchronizes the timings of the periodic communications established by the respective first and the second applications 41 and 42. Therefore, after the second application 42 starts to run, the second time interval Tb between the periodic communications with the second server 6b by the second application 42 is changed to 2*Ta.

The image processing device enters again deep sleep mode after the second application 42 is started to run. The image processing device 3 then is powered back on and is back to normal mode at T35 which is after the elapse of the first time interval Ta from the previous periodic communication (time T33) by the first application 41, and enables the first application 41 to establish the periodic communication. The second application 42 does not establish the periodic communication at this time. After the periodic communication by the first application 41, the image processing device 3 enters again deep sleep mode. The image processing device 3 is powered back on and is back to normal mode at the first time intervals Ta on the periodical basis. Every time the image processing device 3 is powered back on and is back to normal mode, the first application 41 establishes the periodic communication with the first server 6a. On the other hand, the second application 42 does not establish the periodic communication with the second server 6b every time the image processing device 3 is powered back on and is back to normal mode. The second application 42 establishes the periodic communication with the second server 6b once in twice that the image processing device 3 is powered back on and is back to normal mode. The periodic communication by the second application 42 is established almost at the same time as the periodic communication by the first application 41.

The example when the first time interval Ta is changed to one-half of the second time interval Tb is explained next. As shown in FIG. 13B, time T40 at which the first application 41 starts to run to T44 at which the second application 42 starts to run are the same as the aforementioned times T30 to T34. After the second application 42 starts to run at time T44, the image processing device 3 puts the periodic communication managing part 44 into operation at the image processing device 3. The periodic communication managing part 44 changes the first time interval Ta to one-half of the second time interval Tb of the first time interval Ta and the second time interval Tb. Also, the periodic communication managing part 44 synchronizes the timings of the periodic communications established by the respective first and the second applications 41 and 42. Therefore, after the second application 42 starts to run, the first time interval Ta between the periodic communications with the first server 6a by the first application 41 is changed to Tb/2.

The image processing device enters again deep sleep mode after the second application 42 is started to run. The image processing device 3 is then powered back on and is back to normal mode at T45 which is after the elapse of the first time interval Tb/2 from the previous periodic communication (time T43) by the first application 41, and enables the first application 41 to establish the periodic communication. The second application 42 does not establish the periodic communication at this time. After the periodic communication by the first application 41, the image processing device 3 enters again deep sleep mode. The image processing device 3 is powered back on and is back to normal mode from deep sleep mode at the first time intervals Tb/2 on the periodical basis. Every time the image processing device 3 is powered back on and is back to normal mode, the first application 41 establishes the periodic communication with the first server 6a. On the other hand, the second application 42 does not establish the periodic communication with the second server 6b every time the image processing device 3 is powered back on and is back to normal mode. The second application 42 establishes the periodic communication with the second server 6b once in twice that the image processing device 3 is powered back on and is back to normal mode. The periodic communication by the second application 42 is established almost at the same time as the periodic communication by the first application 41.

It is assumed that the first time interval 53 and the second time interval 54 are not allowed to match with each other. In this case, one of the time intervals is changed to N times or one-Nth another time interval so that the timings of the periodic communications by the first application 41 and the second application 42 may be matched. Even when the changeable range 22c of the first server 6a is not overlapped with the changeable range 22c of the second server 6b, the timings of the periodic communications are allowed to be synchronized.

It is assumed that the first time interval 53 between the periodic communications with the first server 6a and the second time interval 54 between the periodic communications with the second server 6b have different values from each other. In this case, as described above, the image processing device 3 changes one or both of the first time interval 53 and the second time interval 54 so that each of the first application 41 and the second application 42 is allowed to establish the periodic communication with the respective first and second servers 6a and 6b at the same time. The image processing device 3 also controls to synchronize the timing for the first application 41 to establish the periodic communication with the first server 6a and that for the second application 42 to establish the periodic communication with the second server 6b. Even when the image processing device 3 enters deep sleep mode, it is back to normal mode at the synchronized timing at which the first application 41 and the second application 42 establish the periodic communications. The image processing device 3, therefore, is allowed to realize the periodic communications with the respective first and second servers 6a and 6b almost at the same time. As a result, the frequency of wake-up from deep sleep mode to normal mode can be reduced, resulting in better power-saving effect than before.

As described above, the shorter first time interval 53 is set in advance than the second time interval 54. The same processes may be applied even when the lengths of the intervals are opposite.

As described above, the connections with the respective first and second servers are effectively maintained at the image processing device, and a higher power-saving effect than before can be obtained at the same time.

(Modifications)

While certain embodiments of the present invention have been described above, the present invention is not limited to the above embodiments. Various modifications may be applied to the present invention.

According to one or more embodiments as described above, the operations when the two servers 6a and 6b are mainly installed on the cloud 5 and two applications 41 and 42 run on the image processing device 3 are described. The above-described operations may also be applied when more than three servers are installed on the cloud 5 and more than three applications run on the image processing device 3. In such a case, the image processing device 3 adjusts the multiple time intervals set in advance to establish the separate periodic communication with each of the multiple servers. As a result, the multiple applications are allowed to establish the periodic communications with the respective servers at the same timing. The time intervals may be adjusted by matching the other time intervals with the longest time interval, or by matching the other time intervals with the shortest time interval, for example. If all the time intervals are not allowed to be matched with each other, the time intervals may be adjusted by changing at least one of the time intervals to N times or one-Nth times another time interval as described above.

In the above-described embodiments, there are three steps of the power mode at the image processing device 3, normal mode, sleep mode and deep sleep mode. However, this is given not for limitation. More specifically, the present invention can be applied to any image processing device 3 that has at least two steps of the power mode, normal mode and deep sleep mode (power-saving mode).

In the above-described embodiments, the first application 41 and the second application 42 run on the main controller 30 at the different timings. However, this is given not for limitation. The first application 41 and the second application 42 may start to run one after the other after the image processing device 3 is powered on.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing device that communicates with a first server and a second server, the image processing device comprising:
  a main controller that:
    establishes a connection that enables communication with the first server, and establishes a periodic communication with the first server to maintain the connection,
    establishes a connection that enables communication with the second server, and establishes a periodic communication with the second server to maintain the connection,
    manages a first time interval between the periodic communication with the first server, and
    manages a second time interval between the periodic communication with the second server; and
  a power controller that:
    stops power supply to the main controller if a predetermined condition is met, and
    starts the power supply to the main controller based on the first time interval and the second time interval,
  wherein the main controller changes one or both of the first time interval and the second time interval, and synchronizes a timing at which the main controller establishes the periodic communication with the first server and a timing at which the main controller establishes the periodic communication with the second server to enable the main controller to establish the periodic communication with the first and second servers at the same timing when the first time interval differs from the second time interval.

2. The image processing device according to claim 1, wherein the main controller matches the first time interval with the second time interval when the first time interval is shorter than the second time interval.

3. The image processing device according to claim 2, wherein
  the main controller decreases the first time interval and the second time interval if an error notice is received by the main controller when the power supply to the main controller is restarted based on the first time interval and the second time interval, and
  the main controller establishes the periodic communication with the respective first and second servers after the first time interval is matched with the second time interval.

4. The image processing device according to claim 1, wherein the main controller matches the second time interval with the first time interval when the second time interval is longer than the first time interval.

5. The image processing device according to claim 4, wherein
  the main controller extends the first time interval and the second time interval if a time change request is received by the main controller from the second server when the power supply to the main controller is restarted based on the first time interval and the second time interval, and
  the main controller establishes the periodic communication with the first and second servers after the second time interval is matched with the first time interval.

6. The image processing device according to claim 1, wherein the main controller matches another time interval with one of the first and second time intervals if one of the first or second time interval is not allowed to change.

7. The image processing device according to claim 1, wherein the main controller changes one of the first or second time interval to N times or one-Nth times another time interval when the first time interval and the second time interval are not allowed to match each other.

8. An image processing system comprising:
  a first server;
  a second server; and
  an image processing device that communicates with the first server and the second server, wherein
  each of the first and second servers includes:
    a communication controller that establishes a connection that enables communication with the image processing device in response to a connection request from the image processing device and maintains the connection with the image processing device by receiving a periodic communication from the image processing device, and terminates the connection if a predetermined period of time has elapsed without receiving the periodic communication from the image processing device,
  the image processing device includes:
    a main controller that:
      establishes a connection that enables the communication with the first server by sending a connection request to the first server, and establishes the periodic communication with the first server to maintain the connection,
      establishes a connection that enables the communication with the second server by sending a connection request to the second server, and establishes the periodic communication with the second server to maintain the connection,
      manages a first time interval between the periodic communication with the first server, and
      manages a second time interval between the periodic communication with the second server; and
    a power controller that stops power supply to the main controller if a predetermined condition is met, and restarts the power supply to the main controller based on the first time interval and the second time interval, and
    the main controller changes one or both of the first time interval and the second time interval and synchronizes a timing at which the main controller establishes the periodic communication with the first server and a timing at which the main controller establishes the periodic communication with the second server to enable the main controller to establish the periodic communication with the first and second servers at the same timing when the first time interval differs from the second time interval.

9. The image processing system according to claim 8, wherein the main controller matches the first time interval with the second time interval when the first time interval is shorter than the second time interval.

10. The image processing system according to claim 9, wherein each of the communication controllers of the first and second servers:
  sends an error notice when the periodic communication is received from the image processing device after the connection with the image processing device is terminated, and decreases the first time interval and the second time interval if the error notice is received by the main controller of the image processing device when the power supply to the main controller is restarted based on the first time interval and the second time interval, and wherein the main controller establishes the periodic communication with the first and second servers after the first time interval is matched with the second time interval.

11. The image processing system according to claim 8, wherein the main controller matches the second time interval with the first time interval when the second time interval is longer than the first time interval.

12. The image processing system according to claim 11, wherein the communication controller of the second server sends a time change request to the image processing device to change the time interval between the periodic communication if a value of the interval from a receipt of the previous periodic communication to the receipt of the current periodic communication exceeds a predetermined minimum value when the periodic communication is received from the image processing device before the predetermined period of time has elapsed, and the main controller of the image processing device extends the first time interval and the second time interval if the time change request is received by the main controller from the second server when the power supply to the main controller is restarted based on the first time interval and the second time interval and the main controller establishes the periodic communication with the first and second servers after the second time interval is matched with the first time interval.

13. The image processing system according to claim 8, wherein the main controller matches another time interval with one of the first and second time intervals if one of the time intervals is not allowed to change.

14. The image processing system according to claim 8, wherein the main controller changes one of the first or second time interval to N times or one-Nth times another time interval when the first time interval and the second time interval are not allowed to match each other.

15. A non-transitory computer readable recording medium storing a program to be executed by an image processing device that communicates with a first server and a second server, the image processing device including a main controller, wherein execution of the program by the image processing device causes the image processing device to execute a process comprising:

establishing:
a connection that enables communication with the first server,
a periodic communication with the first server to maintain the connection,
a connection that enables communication with the second server, and
a periodic communication with the second server to maintain the connection;

managing a first time interval between the periodic communication with the first server and a second time interval between the periodic communication with the second server;

stopping power supply to the main controller if a predetermined condition is met, and restart the power supply to the main controller based on the first time interval and the second time interval;

determining whether the first time interval between the periodic communication with the first server by the main controller is different from the second time interval between the periodic communication with the second server by the main controller;

changing one or both of the first time interval and the second time interval and synchronizing a timing at which the main controller establishes the periodic communication with the first server and a timing at which the main controller establishes the periodic communication with the second server to enable the main controller to establish the periodic communication with the first and second servers at the same timing when a determination is made that the first time interval differs from the second time interval; and enabling the power controller to restart the power supply to the main controller based on the one or both of the first time interval and the second time interval that were changed.

16. The non-transitory computer readable recording medium according to claim 15, wherein the first time interval is matched with the second time interval when the first time interval is shorter than the second time interval.

17. The non-transitory computer readable recording medium according to claim 16, wherein the first time interval and the second time interval are decreased if an error notice is received by the main controller when the power supply to the main controller is restarted based on the first time interval and the second time interval and the main controller establishes the periodic communication with the first and second servers after the first time interval is matched with the second time interval.

18. The non-transitory computer readable recording medium according to claim 15, wherein the second time interval is matched with the first time interval when the second time interval is longer than the first time interval.

19. The non-transitory computer readable recording medium according to claim 18, wherein
the first time interval and the second time interval are extended if a time change request is received by the main controller from the second server when the power supply to the main controller is restarted based on the first time interval and the second time interval, and
the main controller establishes the periodic communication with the first and second servers after the second time interval is matched with the first time interval.

20. The non-transitory computer readable recording medium according to claim 15, wherein another time interval is matched with one of the first and second time intervals if one of the time intervals is not allowed to change.

21. The non-transitory computer readable recording medium according to claim 15, wherein one of the first or second time interval is changed to N times or one-Nth times another time interval when the first time interval and the second time interval are not allowed to match each other.

* * * * *